United States Patent
Looser et al.

(10) Patent No.: US 10,697,350 B2
(45) Date of Patent: Jun. 30, 2020

(54) THERMOSTATIC VALVE

(71) Applicant: Mahle International GmbH, Stuttgart (DE)

(72) Inventors: Hans-Joerg Looser, Aichelberg (DE); Bert Hiller, Weinstadt (DE); Tim Speer, Herrenberg (DE)

(73) Assignee: Mahle International GmbH (DE)

( * ) Notice: Subject to any disclaimer, the term of this patent is extended or adjusted under 35 U.S.C. 154(b) by 224 days.

(21) Appl. No.: 14/863,706

(22) Filed: Sep. 24, 2015

(65) Prior Publication Data
US 2016/0090897 A1 Mar. 31, 2016

(30) Foreign Application Priority Data
Sep. 25, 2014 (DE) .................. 10 2014 219 490

(51) Int. Cl.
*F01P 7/16* (2006.01)
*G05D 23/30* (2006.01)
*G05D 23/185* (2006.01)

(52) U.S. Cl.
CPC .......... *F01P 7/165* (2013.01); *G05D 23/1852* (2013.01); *G05D 23/30* (2013.01)

(58) Field of Classification Search
CPC ... G05D 23/30; F01P 7/165; F01P 7/16; F01P 2070/04; F01P 7/161; H01R 4/28
USPC ............................... 236/34.5, 68 B
See application file for complete search history.

(56) References Cited

U.S. PATENT DOCUMENTS

| 5,676,308 A | 10/1997 | Saur | |
| 6,347,745 B1 * | 2/2002 | McClure | F01P 7/16 137/468 |
| 6,371,059 B1 * | 4/2002 | Lemberger | F01P 7/167 123/41.02 |

(Continued)

FOREIGN PATENT DOCUMENTS

| DE | 2717402 A1 * | 10/1978 | ......... H01R 13/5808 |
| DE | 4409547 A1 * | 1/1995 | .............. F01P 7/167 |

(Continued)

OTHER PUBLICATIONS

Fit Tolerances—Three General Types of Fit, MMT Observatory. May 2014, http://mmto.org/~dclark/Reports/EncoderUpgrade/fittolerences [Read-Only].pdf.*

(Continued)

*Primary Examiner* — Marc E Norman
*Assistant Examiner* — Schyler S Sanks
(74) *Attorney, Agent, or Firm* — Fishman Stewart PLLC

(57) ABSTRACT

A thermostatic valve for a cooling circuit of a motor vehicle may include a thermostat housing part, a connector, a connector sleeve and an expansion element including a hearing resistor. The connector and the expansion element may each be insertable into the connector sleeve via a sealed and mechanically plugged-in connection. The connector and the expansion element together with the connector sleeve may define an assembly. The assembly may be insertable into the thermostat housing part via another sealed and mechanically plugged-in connection. The connector and the heating resistor may define an electrically conductive connection when the connector and the expansion element are inserted into the connector sleeve.

20 Claims, 3 Drawing Sheets

(56) References Cited

U.S. PATENT DOCUMENTS

| | | | |
|---|---|---|---|
| 6,644,619 B2 * | 11/2003 | Friesenhahn | F01P 7/167 251/11 |
| 7,730,855 B2 * | 6/2010 | Lemberger | F01P 7/167 123/142.5 E |
| 7,971,797 B2 | 7/2011 | Habermann et al. | |
| 8,251,296 B2 * | 8/2012 | Mabboux | G05D 23/023 236/100 |
| 2004/0216700 A1 * | 11/2004 | Hutchins | B60H 1/00314 123/41.08 |
| 2005/0242311 A1 * | 11/2005 | Willers | F16K 31/025 251/61 |
| 2006/0113399 A1 | 6/2006 | Maraux et al. | |
| 2006/0215731 A1 * | 9/2006 | Gadonniex | G01K 1/16 374/208 |
| 2009/0205589 A1 * | 8/2009 | Auweder | F01P 7/161 123/41.09 |
| 2013/0032393 A1 * | 2/2013 | Toyama | B60R 16/0215 174/72 A |
| 2013/0200167 A1 | 8/2013 | Auweder et al. | |

FOREIGN PATENT DOCUMENTS

| | | | | |
|---|---|---|---|---|
| DE | 29500897 U1 | 5/1996 | | |
| DE | 19735058 A1 | 2/1999 | | |
| DE | 602004004250 T2 | 11/2007 | | |
| DE | 102006044514 A1 | 4/2008 | | |
| DE | 602005002211 T2 | 5/2008 | | |
| DE | 102008051267 A1 | 4/2010 | | |
| DE | 19735058 B4 * | 9/2010 | | F01P 7/16 |
| DE | 102010033564 A1 | 2/2012 | | |
| EP | 0853267 A1 * | 7/1998 | | F01P 7/167 |
| FR | 2853709 A1 * | 10/2004 | | F01P 7/167 |

OTHER PUBLICATIONS

V1289-75 Low Temperature FKM—Parker O-rings & O-ring Products—United Seal, Aug. 2013, http://www.unitedseal.com/gasket-maker/item/v1289-75-low-temperature-fkm/.*
English translation of DE2717402A1.*
English translation of DE19735058B4.*
English translation of EP0853267A1.*
English Translation of FR2853709A1.*
English Translation of DE4409547A1.*
"Electric Heater", Encyclopaedia Brittanica, Apr. 6, 2017.*
German Search Report for DE-102014219490.3, dated Jun. 1, 2015.
English abstract for DE-19735058.
English abstract for DE-102008051267.
English abstract for DE-602004004250.

\* cited by examiner

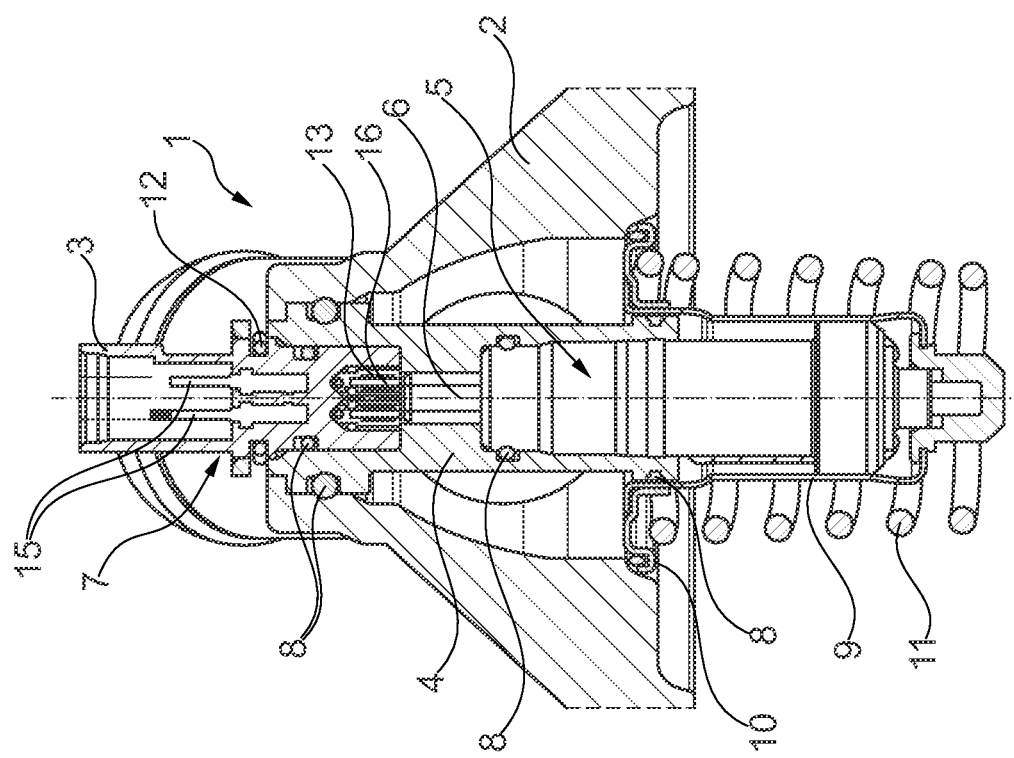
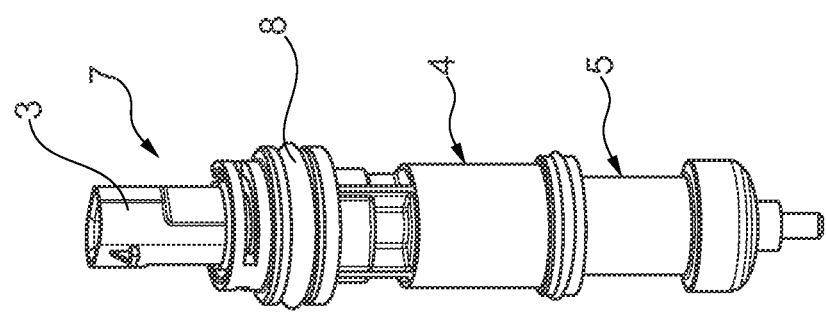
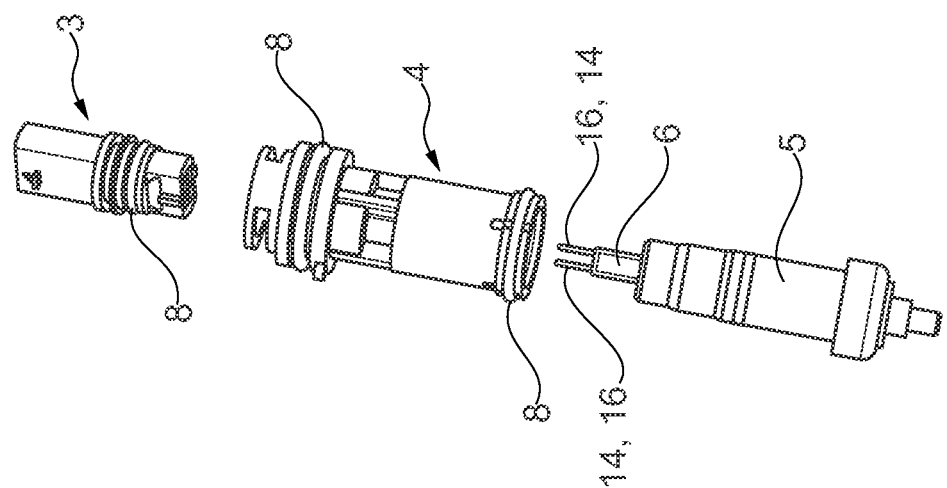

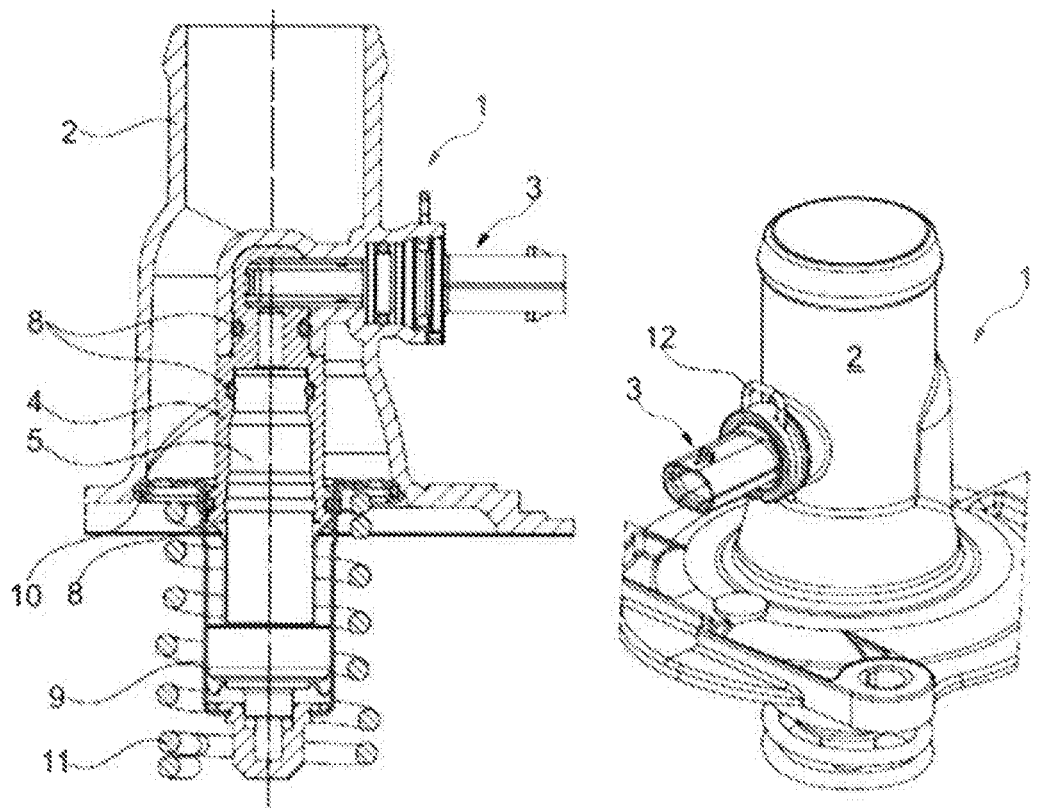
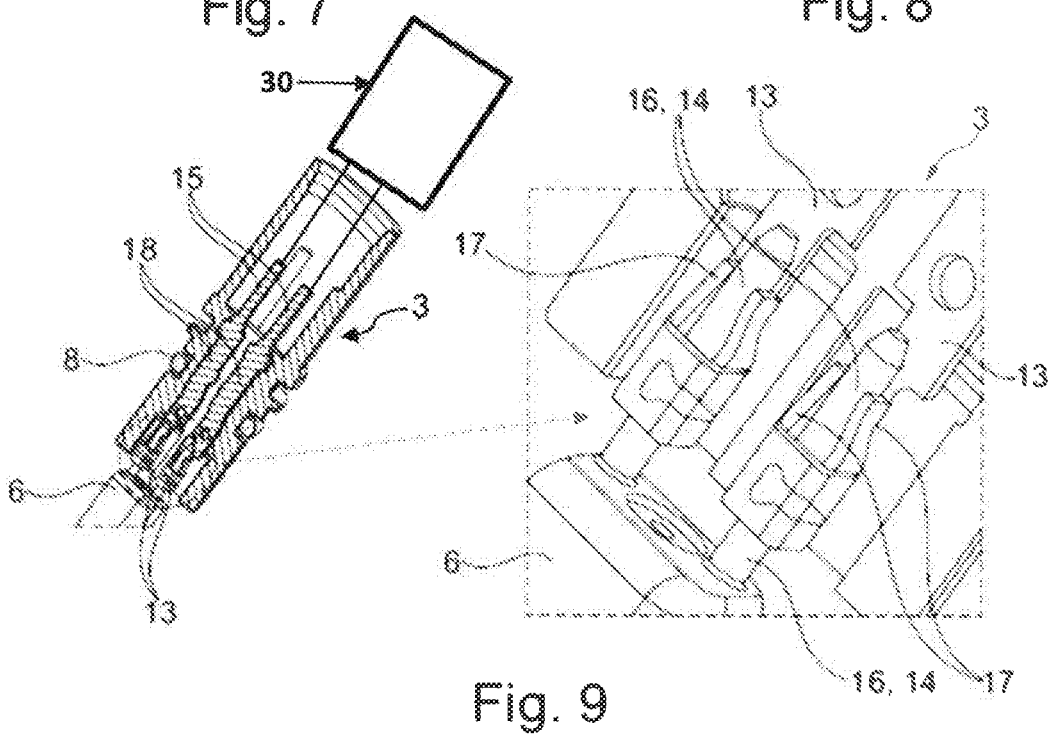
Fig. 7
Fig. 8
Fig. 9

THERMOSTATIC VALVE

CROSS-REFERENCE TO RELATED APPLICATIONS

This application claims priority to German Patent Application No. 10 2014 219 490.3, filed Sep. 25, 2014, the contents of which are hereby incorporated by reference in its entirety.

TECHNICAL FIELD

The present invention relates to a thermostatic valve, in particular for a cooling circuit in a motor vehicle. The invention also relates to a chilling circuit or a cooling circuit with at least one such thermostatic valve.

BACKGROUND

DE 197 35 058 A1 discloses a cooling system for an internal combustion engine with a liquid coolant, a heat exchanger of an additional device being connected to the circuit for the coolant by means of a switching valve. The switching valve contains as a switching element a thermostatic operating element, which is arranged in a valve chamber. The valve chamber, which can be shut off with respect to the heat exchanger of the additional device by means of the valve element, is adjoined by a supply connection and a return connection for the coolant, so that, even when the connection to the heat exchanger of the additional device in the valve chamber is shut off, a coolant flow is still maintained. This is intended in particular to reduce the reaction time of the switching valve, since the flowing coolant has the effect in particular of helping to cool down a thermostatic operating element.

Thermostatic valves have already been known for some time and are used in particular for automatic temperature control. Expansion elements are usually used for this purpose in such thermostatic valves and may be formed for example as wax elements. To allow such a thermostatic valve to be actively operated, a heating resistor is usually additionally provided, and when an electric current is applied to this resistor it causes the wax element or the expansion element to heat up and thereby expand, which is accompanied by an opening or closing of the thermostatic valve. The heating resistor is in this case normally fitted with a corresponding contacting system in a thermostat housing part with an encapsulated contact assembly. However, the encapsulation of the contact assembly in the thermostat housing part requires a comparatively complex injection mould. In most cases, the encapsulation of the contacts even necessitates a preassembled unit, which further increases the effort involved in production. Furthermore, the dimensional tolerances of the expansion element receptacle have to meet demanding requirements, which require a great effort to be invested in the making of the mould.

The thermostat housing part has the task not only of receiving the electrical contacting but also of providing the element receptacle and of presenting the customized connector geometry. It must also be possible in addition for an impermeable shielding of the contacting system with respect to the coolant circuit to be produced. As a further important requirement, the plastic encapsulation of the electrical contacts must conform to corresponding types of protection for engine compartment conditions and protect the electrical contacting system from environmental influences, such as for example saltwater, high-pressure steam jets, deep stretches of water or the like. Impermeable encapsulation of the electrical contacting system in turn greatly restricts the choice of material in terms of the plastics that can be used for this, so that for example only high-grade, and consequently expensive, plastics can be used, and at the same time the entire thermostat housing part also has to be produced from this material even though it is actually only required in the region of the expansion element receptacle.

Other disadvantages that have been found with thermostatic valves known from the prior art are that establishing the electrical contacting often requires a complex subassembly, which consists of a plastic preform and other components and has to be produced in a number of joining processes. In most cases, two further encapsulations are required before a complete thermostat housing part or a complete thermostat cover has been completed in this way. Such multiple encapsulations always entail the risk however of air pockets and trouble spots where the polymer materials do not melt, both of which can lead to leakages under sustained extreme conditions. Since the expansion element in conventional thermostatic valves is often also not connected to the thermostat housing part with a form fit, under unfavourable flow conditions it can be displaced from its tight fit. Even profiled seals fitted to the expansion element for sealing a valve head from the thermostat housing part entail a disadvantage, because a different choice of guides is required since the seal can become detached from the sealing groove under unfavourable flow conditions. This happens in particular at the time of the opening or lifting off of the valve head from the seal, if great flow rates occur because of the small gaps. When the valve head has been raised to the extent that the outside diameter of the seal is just exposed and the seal is no longer pressed into the O-ring groove by the valve head, there is the risk of the sealing ring being washed completely out of the sealing groove. Similar conditions occur during the closing of the valve head.

SUMMARY

The present invention therefore addresses the problem of providing an improved embodiment for a thermostatic valve, which is in particular simpler and, as a result, can also be produced at lower cost.

This problem is solved according to the invention by the subject matter of the independent claims. Advantageous embodiments are the subject of the dependent claims.

The present invention is based on the general idea of constructing the thermostatic valve for the first time in a modular manner, so that it is no longer necessary for the expansion element or its electrical contacting system for example to be laboriously injection-moulded into the thermostat housing part, and so there is no longer any need for the complex injection mould that is required for this. The thermostatic valve according to the invention has in this case a thermostat housing part, a connector, a connector sleeve and also an expansion element with a heating resistor. The connector and the expansion element are insertable into the connector sleeve by way of a sealed, mechanical plug-in connection and together with the said sleeve form a prefabricatable assembly, which in turn can be inserted into the thermostat housing part by way of a sealed, mechanical plug-in connection. In the state in which they have been inserted one into the other, the connector and the heating resistor of the expansion element are connected to one another in an electrically conducting manner. The production of the thermostatic valve according to the invention can be made much easier, since for example the connector and the expansion element are first inserted into the connector sleeve and then the assembly prefabricated in this way is fitted into the thermostat housing part. The insertion of the individual component parts of the assembly into one another means in particular that they are already connected to one another in such a way that they are sealed from coolant, and can in this state be easily installed in the thermostat housing part, for example a thermostat cover. This makes it possible to dispense with the previously laborious injection moulding of the expansion element or its electrical contact into the thermostat housing part, together with the extremely complicated injection mould required for this. Consequently, the thermostatic valve according to the invention makes it possible to provide a thermostatic valve of a modular construction that reduces the material costs and at the same time opens up new possibilities with respect to functional reliability, testability and the use of identical parts. Customized connector variants can at the same time be flexibly reproduced, in that only a modification to the connector is required. The modular construction allows both injection-moulded parts to be designed appropriately for the plastic and virtually optimally in terms of technical aspects of injection moulding. The connector sleeve is in this case designed in such a way that it partially or completely encloses the expansion element and positions it in a form-fitting or force-fitting manner. Impermeable shielding of the electrical contacts can be achieved by choosing suitable plastics and for example providing an additional seal with respect to the expansion element. The seal between the connector and the connector sleeve or the expansion element and the connector sleeve may in this case be configured in an axially sealing or radially-axially sealing manner. The connector sleeve itself may be positioned in the thermostat housing part in a force-fitting or form-fitting manner.

The at least one seal is expediently formed as a moulded-on seal or as a separate O-ring seal. Preferably, all of the seals are in this case moulded on the respective components, it even being provided in particular that all of the seals are moulded on the connector sleeve and are formed in each case by at least one sealing lip. One- and two-stage plastic+ rubber injection-moulding processes may be used for this. In the case of a one-stage process that is advantageously used, the hard component and the soft component are injection-moulded in one mould and in one machine. An adhesion promoter is not required. In the case of the two-stage process, the components are injection-moulded on different machines. In the case of the two-stage process, plastic/rubber combinations that achieve an adhesive bond both with and without adhesion promoters may be used. The seals themselves may in this case be formed from hydrogenated acrylonitrile butadiene rubber (HNBR), from fluororubber (FKM) or else from ethylene propylene diene rubber (EPDM). This list, which is not exhaustive, already suggests what a huge variety of types of plastic can be used for the seals, it only being necessary for them to be certain of meeting the requirements that are required for engine compartments, such as for example coolant resistance and temperature resistance.

The connector and the connector sleeve are expediently formed as a part injection-moulded from plastic, in particular as a two-component injection-moulded part, while the connector sleeve can preferably be produced from a fibre-reinforced plastic, in particular from glass-fibre-reinforced polyphthalamide (PPA), polyhexamethylene dodecanediamide (PA6.12) or polyphenylene ether (PPE). The connector sleeve can at the same time be formed as an identical part for a wide variety of embodiments of the thermostatic valve, whereas the connectors can in turn reflect individual customer requirements or wishes.

In the case of an advantageous development of the solution according to the invention, the connector has two first electrical plug-in contacts, facing the expansion element, for connection to the heating resistor of the expansion element, and two second electrical plug-in contacts, facing away from it, for connection for example to a cable harness. The first and second plug-in contacts may in this case be differently formed, so that the connector can in principle serve as an adapter. It is conceivable here in particular that the thermostatic valve is formed identically with regard to its individual components apart from the first plug-in contacts or the connector, so that, merely by varying the first plug-in contacts or the connector, the thermostatic valve that can otherwise be produced identically and consequently at low cost is adaptable to different interfaces with different cable harnesses. Different connector angles, for example 180° or 90°, may also be reproduced in the connector.

In general, the thermostatic valve according to the invention offers the following advantages:

The requirement for the interface is divided between two components, to be specific the connector and the connector sleeve, these then being able to be adapted in each case to different ambient conditions. The connector sleeve has to meet the most demanding requirements with respect to coolant resistance, strength, dimensional stability and impermeability, which require a comparatively cost-intensive material. However, the modular construction allows the use of this cost-intensive material to be restricted to the connector sleeve, and it is not necessary as in the past for it to be provided for the entire thermostat housing part.

The customer-specific wishes or customized variants can be confined to the connector, so that the connector sleeve as such can be produced in great numbers as an identical part. What is more, the injection mould for the thermostat housing part or the cover can also be greatly simplified, since no contacting assembly has to be inserted any longer.

The connector is also not in direct and permanent contact with coolant and is not exposed to high mechanical loads, so that a material of lower cost can be chosen to be used for this.

The assembly according to the invention, consisting of the connector, the connector sleeve and the expansion element, can be used in thermostat housing parts both of plastic and of metal.

The seal attached to the valve head in a form-fitting or adhesively bonding manner makes it possible to use identical guides for the valve head.

It is possible for all of the seals to be moulded on, in particular on the connector sleeve, dispensing with the need for separate O-ring seals to be fitted.

The expansion element may be connected to the connector sleeve in a form-fitting manner, for example by a snap-in connection, and a secure, in particular impermeable sealing mechanism thereby created.

The fitting operation and also the sealing function between the expansion element and the connector sleeve may be validated by leak tests, which was not previously possible because the function of the seal could not be checked by leak testing once the expansion element had been fitted and, as a result, it was only with difficulty that possible damage to the sealing ring could be detected.

Further important features and advantages of the invention emerge from the subclaims, from the drawings and from the associated description of the figures on the basis of the drawings.

It goes without saying that the aforementioned features and the features still to be explained below can be used not only in the respectively specified combination, but also in other combinations or on their own without departing from the scope of the present invention.

Preferred exemplary embodiments of the invention are represented in the drawings and are explained in more detail in the description that follows, the same reference numerals referring to components that are the same or similar or are functionally the same.

BRIEF DESCRIPTION OF THE DRAWINGS

In the drawings,

FIG. 1 schematically shows a sectional representation through a thermostatic valve according to the invention in the case of a first embodiment, FIG. 2 schematically shows an assembly made up of a connector, an expansion element and a connector sleeve, FIG. 3 schematically shows a representation as in FIG. 2, but in an exploded representation, FIGS. 4-6 schematically show views of a thermostatic valve in each case with different connectors, FIG. 7 schematically shows a representation as in FIG. 1, but with a differently formed connector, FIG. 8 schematically shows a view of the thermostatic valve according to FIG. 7, represented in section, FIG. 9 schematically shows a detailed representation of a connection of a heating resistor of an expansion element with a first plug-in contact of the connector.

DETAILED DESCRIPTION

Figure 4:
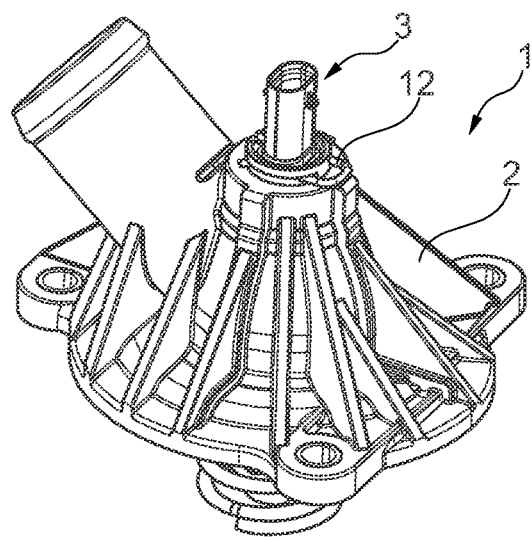

As shown in FIGS. 1 and 7, a thermostatic valve 1 according to the invention, which can be used for example in a cooling circuit of a motor vehicle, has a thermostat housing part 2, a connector 3, a connector sleeve 4 and also an expansion element 5 with a heating resistor 6. The connector 3 and the expansion element 5 are insertable into the connector sleeve 4 by way of a sealed, mechanical plug-in connection and together with the said sleeve form an assembly 7, such as that represented according to FIG. 2 and in an exploded representation according to FIG. 3. The assembly 7 itself can likewise be inserted as a whole into the thermostat housing part 2 by way of a sealed, mechanical plug-in connection. In the state in which they have been inserted one into the other, the connector 3 and the heating resistor 6 of the expansion element 5 are connected to one another in an electrically conducting manner.

As a difference from the thermostatic valves that are known from the prior art, the thermostatic valve 1 according to the invention consequently makes it possible for the assembly 7 to be formed separately, and in particular the connector sleeve 4 to be formed separately, so that the qualitatively high-grade, and therefore expensive, plastic that is required for the connector sleeve 4 does not have to be used for the entire thermostat housing part 2. This was required in the case of the thermostatic valves known from the prior art because the expansion element 5 had to be injection-moulded in the plastic of the thermostat housing part 2.

If FIGS. 1 to 3 and 7 are considered, it can be seen that on the connector 3, on the connector sleeve 4 and/or on the expansion element 5 there is respectively provided at least one seal 8, which makes a sealed interconnection and/or a sealed insertion of the assembly 7 into the thermostat housing part 2 possible. The expansion element 5 is in this case drive-connected to a slide 9 and/or a valve head 10, and thereby makes temperature-dependent opening and closing of the thermostatic valve 1 possible. If, for example, hot coolant flows around the expansion element 5, this hot coolant brings about heating of the expansion element 5, and consequently an expansion of the same. On account of the expansion, the expansion element 5 adjusts the slide 9, and by way of the latter the valve head 10, against a spring force of a spring 11. By adjusting the valve head 10, it is lifted off from its valve seat and the valve is thereby opened. A further seal 8 may be additionally arranged between the connector sleeve 4 and the slide 9. The seals 8 that are represented are preferably formed here as a seal that is moulded on the respective component 3 or 4, but may also be formed as a separate O-ring seal. A plastic, in particular a hydrogenated acrylonitrile butadiene rubber (HNBR), a fluororubber (FKM) or an ethylene propylene diene rubber (EPDM), may be used for example for the seal 8.

The connector 3 and the connector sleeve 4 are preferably formed as an injection-moulded part, in particular as a two-component injection-moulded part and, as a result, can be produced not only at low cost but also to an extremely high level of quality. In order to be able to absorb better the mechanical forces acting on the connector sleeve 4, in particular including in the long term, the connector sleeve 4 may also be formed from a fibre-reinforced plastic, in particular from glass-fibre-reinforced polyphthalamide (PPA), polyhexamethylene dodecanediamide (PA6.12) or polyphenylene ether (PPE).

Figure 5:
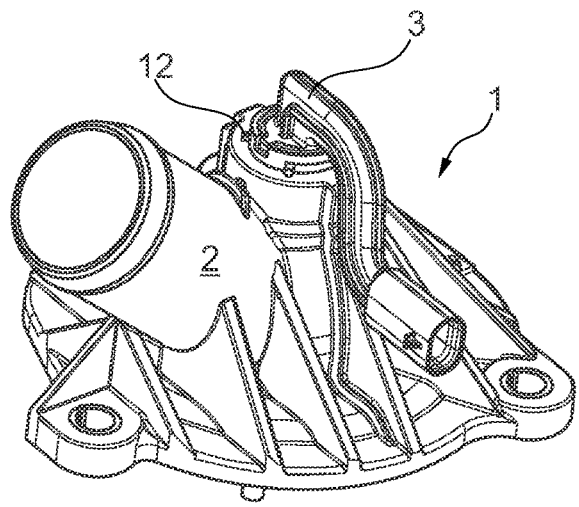
Figure 6:
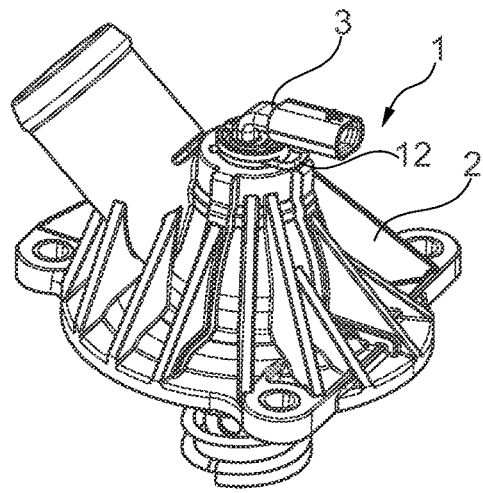

For fixing the assembly 7 in the thermostat housing part 2, the connector sleeve 4 may for example be fixed in the thermostat housing part 2 mechanically by way of a snap-in connection or a bayonet fastener. The connector 3 and/or the expansion element 5 may likewise be fixed in the connector sleeve 4 by way of a snap-in connection. It goes without saying that a purely clamping connection, in which the seals 8 act as clamping bodies, is alternatively also conceivable. As a result of these snap-in connections, in particular between the connector 3 and the connector sleeve 4 or the expansion element 5, the entire assembly 7, for example according to FIG. 1, can be inserted from below into the thermostat housing part 2, which may for example be formed as a cover, and subsequently fixed on the thermostat housing part 2 by way of a spring clip 12 (cf. also FIGS. 4 to 8 in particular). A wide variety of embodiments of the connector 3 can also be seen in FIGS. 4 to 6, FIG. 4 showing that the connector 3 is directed in line with the expansion element 5, whereas FIGS. 5 and 6 show that it is angled away from the latter. According to FIG. 5, the connector 3 also has a swan-like neck.

If the connector 3 is considered more closely, it can be seen that it has two first electrical plug-in contacts 13, facing the expansion element 5, for connection to the heating resistor 6 or to round pins 14 of the same (cf. FIG. 9). In addition, the connector 3 has two second electrical plug-in contacts 15, facing away from the expansion element 5, for connection to a cable harness 30 of a motor vehicle. The first and second plug-in contacts 13 and 15 may in this case be differently formed, which makes it possible in principle for the connector 3 to be used as an adapter, and consequently to be connected to a wide variety of electrical systems in a wide variety of motor vehicles with an otherwise entirely identically constructed thermostatic valve 1. If the two first plug-in contacts 13 according to FIG. 9 are considered once again, it can be seen that they respectively have two contact springs 17, into which the round connectors 16 or round pins 14 arranged on the heating resistor 6 can be inserted in an electrically conducting manner. The connector 3 consequently comprises two stamped sheet-metal parts 18, which respectively have the first and second plug-in contacts 13 and 15 at their longitudinal ends.

In general, the connector 3 may also be arranged on the cable harness itself and have two electrical plug-in contacts 13, 15, facing the expansion element 5, for connection to the heating resistor 6, it being possible for the connector 3 to be connected to the connector sleeve 4 and/or the thermostat housing part 2 mechanically by way of a snap-in connection or a spring clip.

The thermostat housing part 2 may be formed for example from plastic or from metal, whereby further increased flexibility can be achieved. The connector 3 and the expansion element 5 have been respectively inserted in the connector sleeve 4 in a force-fitting and/or form-fitting manner and by this means are reliably held. The connector sleeve 4 itself forms a coolant-sealed enclosure around the actual electrical contacting and serves at the same time for positioning and arresting the expansion element 5 with respect to the thermostat housing part 2. The connector 3 is consequently connected to the heating resistor 6 of the expansion element 5 by way of an electrical contacting that is arranged within the connector sleeve 4, and is consequently sealed, and at its second electrical plug-in contacts 15 has the possibility of forming them in a way corresponding to customer wishes, and thereby using the thermostatic valve 1 according to the invention in a variety of ways. In principle, the individual components 3, 4, 5 of the assembly 7 can be detached again from one another, so that disassembly is also possible, the thermostatic valve 1 usually no longer being detached once the assembly 7 has been put together and inserted into the thermostat housing part 2. The plug-in connections allow the acceptance not only of axial movements that are caused by thermal expansions but also at the same time of pressure surges that occur in a cooling system.

With the thermostatic valve 1 according to the invention, it can for the first time be constructed in a modular manner, and consequently can be produced much more easily, making it possible in particular to avoid previously required multiple encapsulations of the electrical contacts, together with the associated possibilities of error. In addition, with the thermostatic valve 1 according to the invention, now only the connector sleeve 4 has to be formed from the comparatively high-grade plastic, and no longer the entire thermostat housing part 2, allowing the thermostatic valve 1 according to the invention to be produced at lower cost overall. The wishes for customized variants are in this case restricted exclusively to the second electrical plug-in contacts 15 of the connector 3, so that the other component parts of the thermostatic valve 1, in particular the connector sleeve 4, can be produced in great numbers as identical parts, and consequently at low cost. What is more, dispensing with the need for encapsulation means that an injection mould can be made much more simple, and consequently less costly, it also being possible moreover to dispense with the production of previously required preforms of plastic in a number of joining processes.

Moulding preferably all of the seals 8 on the respective components 3, 4, 5, also makes it possible to dispense with the use of previously required separate O-ring seals, and the fitting of them, whereby the production costs of the thermostatic valve 1 according to the invention can in turn be reduced.

The invention claimed is:

1. A thermostatic valve for a cooling circuit of a motor vehicle comprising:

a thermostat housing part, a connector, a connector sleeve and an expansion element including a heating resistor protruding axially therefrom, the connector structured as an adapter facilitating an electrical connection between the expansion element and a cable harness;

a first outer circumferential seal disposed on the connector, the connector being insertable into the connector sleeve via a first mechanically plugged-in connection, a second outer circumferential seal disposed on the expansion element, the expansion element being insertable into the connector sleeve via a second mechanically plugged-in connection, wherein the connector and the expansion element together with the connector sleeve define an assembly, a third outer circumferential seal disposed on the assembly, the assembly being insertable into the thermostat housing part via a third mechanically plugged-in connection, wherein the third outer circumferential seal forms a sealed interconnection and a sealed insertion of the assembly into the thermostat housing part;

a slide and a valve head, the expansion element drive-connected to at least one of the slide and the valve head;

a fourth outer circumferential seal arranged between the connector sleeve and the slide providing a sealed interconnection therebetween;

wherein the heating resistor includes a body and at least one electrical contact, the body extending within the connector sleeve across an axial distance between the expansion element and the connector, the at least one electrical contact protruding from the body and, when the connector and the expansion element are inserted into the connector sleeve, connected to the connector providing an electrically conductive connection between the connector and the expansion element;

wherein the slide operatively connects the expansion element to the valve head, and wherein the valve head is adjustable from a closed position to an open position via an expansion of the expansion element, the valve head biased against and sealingly contacting the thermostat housing part when in the closed position, and spaced apart from the thermostat housing part defining a coolant through-flow area when in the open position.

2. The thermostatic valve according to claim 1, wherein at least one of the first outer circumferential seal, the second outer circumferential seal, the third outer circumferential seal, and the fourth outer circumferential seal is at least one of a moulded-on seal and a separate O-ring seal.

3. The thermostatic valve according to claim 1, wherein at least one of:
the connector and the connector sleeve are formed as a two-component injection-moulded part of plastic; and
the connector sleeve is formed from a fibre-reinforced plastic.

4. The thermostatic valve according to claim 1, wherein at least one of the first outer circumferential seal, the second outer circumferential seal, the third outer circumferential seal, and the fourth outer circumferential seal is composed of at least one of a hydrogenated acrylonitrile butadiene rubber, a fluororubber and an ethylene propylene diene rubber.

5. The thermostatic valve according to claim 1, wherein:
at least one of the connector and the expansion element are secured in the connector sleeve mechanically via a snap-in connection; and
the connector sleeve is secured in the thermostat housing part mechanically via a snap-in connection.

6. The thermostatic valve according to claim 1, wherein the connector includes a set of first electrical plug-in contacts projecting axially towards the expansion element for connecting to the heating resistor of the expansion element, and the connector further includes a set of second electrical plug-in contacts projecting axially away from the expansion element for connecting to the cable harness.

7. The thermostatic valve according to claim 6, wherein:
the set of first plug-in contacts are configured differently from the set of second plug-in contacts; and
the set of first plug-in contacts and the set of second plug-in contacts are angled away from one another.

8. The thermostatic valve according to claim 6, wherein at least one of:
the set of first plug-in contacts each have a contact spring, wherein each contact spring of the set of first plug-in contacts respectively receive a second connector arranged on the heating resistor in an electrically conducting manner, and
the connector is composed of stamped sheet-metal parts embedded in plastic, wherein said stamped sheet-metal parts include the set of first plug-in contacts and the set of second plug-in contacts at a first longitudinal end and a second longitudinal end, respectively.

9. The thermostatic valve according to claim 1, wherein the connector and the expansion element are each insertable into the connector sleeve to define at least one of a force-fitting connection and a form-fitting connection.

10. A cooling circuit of a motor vehicle, comprising a thermostatic valve, the thermostatic valve including:
a thermostat housing part, a connector structured as an adapter, a connector sleeve, and an expansion element including a heating resistor;
a first outer circumferential seal disposed on the connector, the connector inserted into a first longitudinal end of the connector sleeve and detachably couplable thereto via a first mechanically plugged-in connection, wherein the first outer circumferential seal provides a sealed interconnection between the connector and the connector sleeve;
a second outer circumferential seal disposed on the expansion element at an end of the expansion element adjacent to the heating resistor, the expansion element inserted into a second longitudinal end of the connector sleeve and detachably couplable thereto via a second mechanically plugged-in connection, wherein the second outer circumferential seal provides a sealed interconnection between the expansion element and the connector sleeve, and wherein at least the expansion element is secured to the connector sleeve via a snap-in connection;
wherein the heating resistor is disposed within the connector sleeve between the expansion element and the connector;
wherein the connector and the expansion element together with the connector sleeve define an assembly, a third outer circumferential seal disposed on the connector sleeve of the assembly, the assembly being insertable into the thermostat housing part and detachably couplable thereto via a third mechanically plugged-in connection, wherein the third outer circumferential seal provides a sealed interconnection and a sealed insertion of the assembly into the thermostat housing part;
wherein the expansion element is drive-connected to at least one of a slide and a valve head, the second longitudinal end of the connector sleeve at least partially arranged within the slide, and wherein a fourth outer circumferential seal is arranged between the connector sleeve and the slide providing a sealed interconnection therebetween;
wherein the connector comprises a plastic body including two first electrical plug-in contacts extending within the plastic body towards the expansion element and two second electrical plug-in contacts extending within the plastic body away from the expansion element, and the heating resistor includes two electrical connectors projecting axially into the plastic body of the connector and electrically coupled to the two first electrical plug-in contacts, and wherein the two first electrical plug-in contacts respectively include two contact springs that receive a respective one of the two electrical connectors of the heating resistor in an electrically conductive manner; and
wherein the connector and the heating resistor define an electrically conductive connection when the connector and the expansion element are inserted into the connector sleeve.

11. A cooling circuit of a motor vehicle comprising a thermostatic valve, the thermostatic valve including:
a thermostat housing part, a connector structured as an adapter, a connector sleeve, and an expansion element including a heating resistor, the thermostat housing part defining a coolant space into which coolant is flowable, the coolant space circumferentially surrounding at least a portion of an outer circumferential surface of the connector sleeve;
a valve head and a slide, the slide circumferentially surrounding the expansion element and coupled to the valve head;
wherein the expansion element is mechanically plugged-into a first longitudinal end of the connector sleeve and the connector is mechanically plugged into a second longitudinal end of the connector sleeve such that a longitudinal axis of the connector extends transversely at an angle relative to a longitudinal axis of the connector sleeve, and wherein the connector, the expansion element, and the connector sleeve define an assembly arranged within the thermostat housing part;
wherein the connector and the heating resistor define an electrically conductive connection when the connector and the expansion element are inserted into the connector sleeve;
wherein the connector is mechanically plugged into the connector sleeve via a connector opening of the connector sleeve, a longitudinal axis of the connector opening extending transversely relative to the longitudinal axis of the connector sleeve; and
wherein the first longitudinal end of the connector sleeve and a portion of the expansion element are arranged within the slide, and the second longitudinal end of the connector sleeve is connected to the thermostat housing part.

12. The cooling circuit according to claim 11, wherein the expansion element is drive-connected to the slide such that an expansion of the expansion element adjusts the slide together with the valve head from a closed position where the valve head is seated on the thermostat housing part and an open position where the valve head is lifted off the thermostat housing part.

13. The thermostatic valve according to claim 1, wherein:
the expansion element is inserted into a first longitudinal end of the connector sleeve and the connector is inserted into a second longitudinal end of the connector sleeve opposite the first longitudinal end;

the first longitudinal end of the connector sleeve and the expansion element are arranged within the slide; and the second longitudinal end of the connector sleeve is connected to the thermostat housing part such that a first portion of the connector is arranged inside the thermostat housing part and a second portion of the connector is arranged outside the thermostat housing part.

14. The thermostatic valve according to claim 1, wherein a portion of the connector sleeve protrudes from the thermostat housing part and includes a circumferentially extending clip recess, and wherein the connector is secured on the thermostat housing part mechanically via a spring clip, a portion of the spring clip extending through the circumferential clip recess of the connector sleeve and engaging the connector and the thermostat housing part.

15. The cooling circuit according to claim 10, wherein:

the slide is coupled to the valve head, circumferentially surrounds the expansion element, and is connected to the second longitudinal end of the connector sleeve; and the first longitudinal end of the connector sleeve is connected to the thermostat housing part, and wherein the expansion element is drive-connected to the slide such that an expansion of the expansion element adjusts the slide together with the valve head from a closed position where the valve head is seated on the thermostat housing part and an open position where the valve head is lifted off the thermostat housing part.

16. The thermostatic valve according to claim 1, wherein:

the thermostat housing part includes a coolant space into which coolant is flowable, the coolant space defined by the thermostat housing part, the valve head, and the connector sleeve and circumferentially surrounding at least a portion of the connector sleeve; and the body of the heating resistor is arranged within the portion of the connector sleeve that is disposed within and circumferentially surrounded by the coolant space.

17. The thermostatic valve according to claim 13, wherein:

the connector is defined by a body including the first portion of the connector and the second portion of the connector;

the first portion of the connector is arranged within the first longitudinal end of the connector sleeve; and a longitudinal axis of the second portion of the connector arranged outside of the thermostat housing part extends transversely relative to a longitudinal axis of the first portion of the connector.

18. The thermostatic valve according to claim 13, wherein:

the connector extends outside of the thermostat housing part via a housing opening disposed in and extending through a wall of the thermostat housing part;

the connector sleeve includes a radial protrusion extending circumferentially around the connector sleeve forming an axial step; and the axial step of the connector sleeve abuts against a complimentary axial step disposed on an inward facing surface of the wall of the thermostat housing part and surrounding the housing opening such that the connector sleeve is positioned in the thermostat housing part in a force-fitting manner.

19. The cooling circuit according to claim 11, wherein at least a portion of the heating resistor extends through a radially outward facing surface of the connector and is arranged within the connector.

20. The cooling circuit according to claim 17, wherein the body of the connector further includes at least one of (i) a bent portion and (ii) a curved portion, extending between the first portion of the connector and the second portion of the connector.

* * * * *